March 8, 1966  H. RYFFEL  3,238,882
HELICAL PUMP

Filed Feb. 19, 1964

INVENTOR.
Hans Ryffel
BY Werner W. Kleeman
ATTORNEY

March 8, 1966 H. RYFFEL 3,238,882
HELICAL PUMP

Filed Feb. 19, 1964 2 Sheets-Sheet 2

INVENTOR.
Hans Ryffel
BY Werner W. Kleeman
ATTORNEY

United States Patent Office 3,238,882
Patented Mar. 8, 1966

3,238,882
HELICAL PUMP
Hans Ryffel, Zurich, Switzerland, assignor to
Dr. G. Datwyler, Zurich, Switzerland
Filed Feb. 19, 1964, Ser. No. 345,977
Claims priority, application Switzerland, Mar. 6, 1963,
2,924/63
10 Claims. (Cl. 103—117)

The present invention broadly relates to a rotary pump and, more specifically, concerns an improved helical or screw pump.

Screw pumps have certain very important advantages in their use. Among these are, for example, the continuous flow of the material being conveyed, and the absence of any imbalance of the rotating members, as for example is present with sliding vane pumps or piston pumps. However, a major disadvantage of screw pumps up to the present was that they were extremely expensive to manufacture.

The present invention, therefore, has for one of its primary objects to provide an improved helical pump which is more economical to manufacture, and which is particularly advantageous for the production of small pump units.

A further important object of the present invention resides in the provision of an improved helical or screw pump which is of extremely simple design, and thus, relatively easy to manufacture, and which provides for uniform wear of the rotating members.

Still another important object of this invention is the provision of an improved helical pump wherein the rotating members, that is, screw nut and worm rotate at equal speeds.

The helical or screw pump of the present invention comprises at least one rotating worm and at least one rotating screw nut whose axis is eccentrically disposed with respect to the worm axis. Characteristic of the invention is that at least one thread face of worm and nut are profiled in a manner to provide two continuous helical lines of contacts along the entire length of worm and nut, while the remaining faces of each thread pitch form two closed and crescent-shaped fluid medium pumping cavities. According to a preferred constructional manifestation of the invention the worm and nut are positively intercoupled for rotation by means of a crosspiece coupling disk.

Other features, objects and advantages of the invention will become apparent by reference to the following detailed description and drawings in which.

Figure 1:
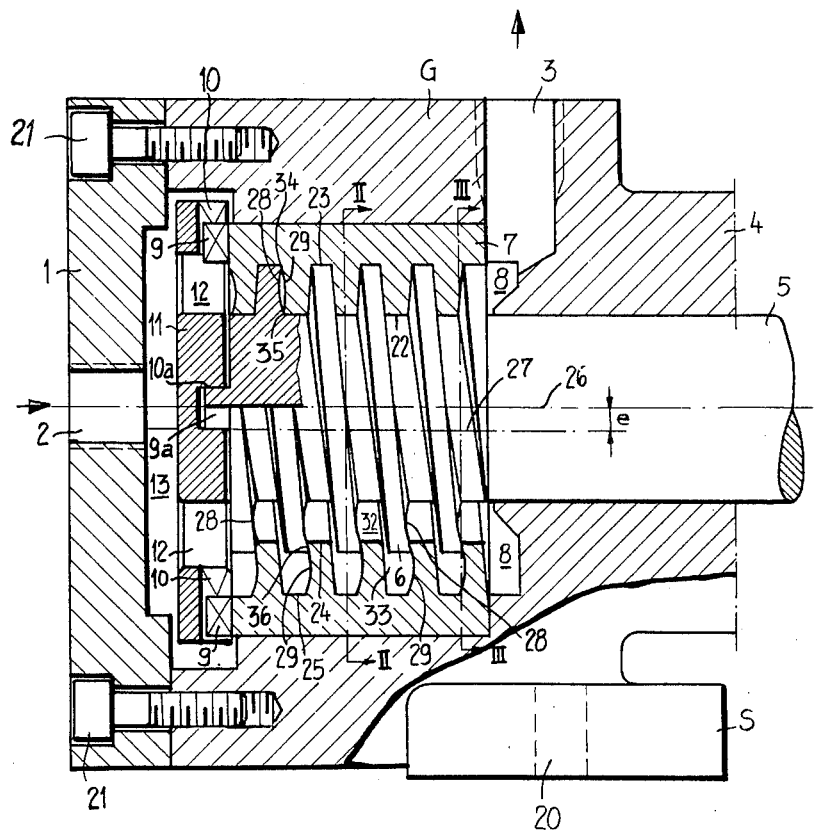
FIGURE 1 is a vertical sectional view through a helical or screw pump designed according to the present invention.

Describing now the drawings and, more specifically, with attention initially directed to FIGURE 1, it can be seen that the illustrated helical or screw pump of the present invention comprises a support S for the pump housing G.

The support S is provided with bore means 20 so that the entire pump unit can be mounted to a suitable support surface. The housing G is closed at one end, in this case the left end of FIGURE 1, by a detachable wall 1 releasably secured to the aforesaid housing G by means of fastening bolts 21 or similar expedients.

This detachable wall 1 is provided with an intake opening 2 for the inflow of fluid medium handled by the pump unit, whereas the housing G is provided with a discharge port or duct 3 for the efflux or discharge of such fluid medium. In the illustrated embodiment it will be recognized that the intake or inlet opening 2 extends axially of the pump housing G while the discharge opening or duct 3 extends radially thereof.

Furthermore, the pump housing G is provided with suitable bearing means 4 located above the base or support S in which there is mounted for rotation a shaft 5 driven by any suitable drive mechanism or drive motor (not shown). The rotatable shaft 5 extends into the interior of the pump housing G in the manner shown and terminates in a coaxial screw or worm 6. Consequently, the shaft 5 constructed as a screw or worm 6 provides an inner rotating member or runner for the pump unit. Further, reference numeral 22 denotes the core of the screw or worm 6 and reference numeral 23 the outer surface or diameter of the aforesaid worm.

It will further be seen that internally of the pump housing G and in operable association with the screw or worm 6 there is arranged a screw nut 7 providing an external rotating member or runner. Here, reference numeral 24 designates the core surface or inner diameter of the nut 7 and numeral 25 the thread diameter of the aforesaid nut. The screw nut 7 is drivingly connected with the screw or worm 6 by a crosspiece coupling disk 11 for positively coupling together worm 6 and screw nut 7. This positive coupling disk means 11 ensures that the external rotating member or nut 7 rotates with the same angular velocity as the driven inner rotating member or worm 6.

Considering further details of the coupling means 11 it will be seen that such is provided with a pair of intersecting recesses 10 and 10a into which engage driving lugs or projections 9 and 9a, respectively, provided at the nut 7 and screw 6, respectively. The recesses 10 are located in a plane which is approximately at right angles to the plane containing the recesses 10a. Quite obviously, the recesses 10, 10a could be provided at the nut 7 and worm 6, respectively, in which case then the lugs or projections 9 and 9a would be provided at the crosspiece coupling disk 11. Either arrangement is suitable for providing the positive intercoupling of the screw nut 7 and worm 6. Furthermore, the crosspiece coupling disk 11 is provided with openings 12, as best shown in FIGURE 1, permitting passage of the fluid medium from the intake opening 2 and the circular chamber 13 within pump housing G to the worm 6. Moreover, at the side of the bearing 4 facing towards the screw nut 7 there is provided an annular chamber or compartment 8 communicating with the discharge opening or duct 3.

It will be seen from FIGURE 1 that the worm 6 rotates about an axis of rotation 26. However, the axis of rotation 27 of the screw nut 7 is eccentric with respect to the axis 26 of the worm 6 and its shaft 5, such eccentricity being represented by reference character $e$ in FIGURE 1. In accordance with a very important feature of the invention the geometric errors occurring by virtue of the eccentric mounting of the extrenal rotating member or nut 7 are eliminated by correcting the thread profile of worm 6 and nut 7.

Figure 2:
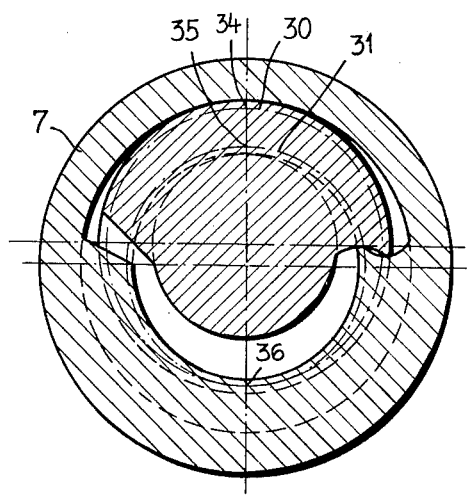
FIGURE 2 is an enlarged cross-sectional view of the screw pump of FIGURE 1, taken along lines II—II thereof.
Figure 3:
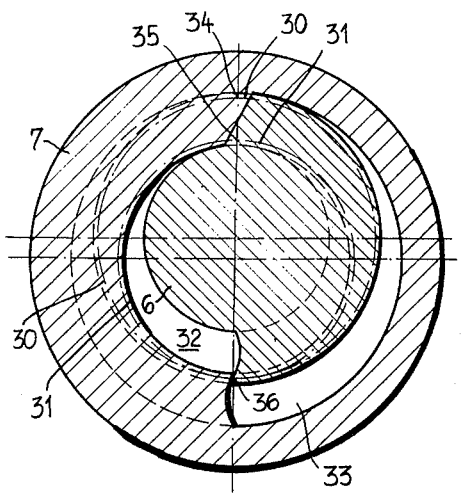
FIGURE 3 is an enlarged cross-sectional view of the screw pump of FIGURE 1, taken along lines III—III thereof.
Figure 4:
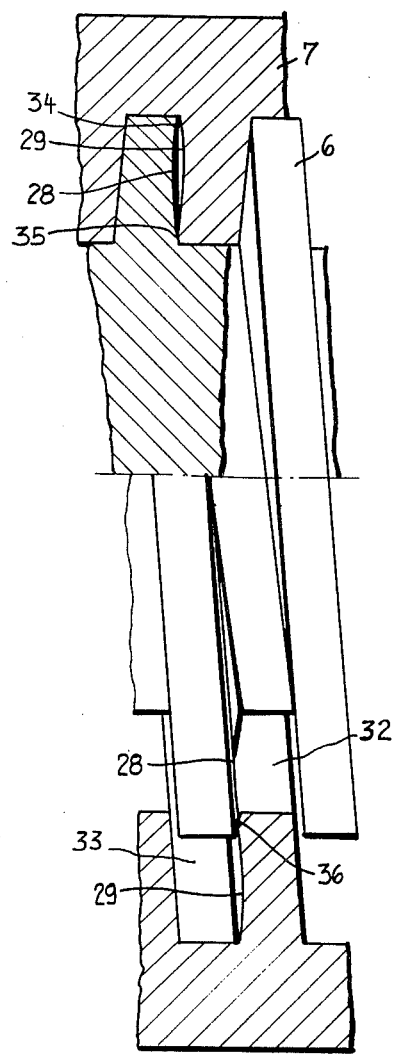
FIGURE 4 is an enlarged fragmentary view, partly in cross-section, of a detail of the screw pump of FIGURE 1.

Thus, as best shown in FIGURES 1 and 4, at least one thread face 28 and 29 of both worm 6 and nut 7 respectively, are profiled in such manner that along the entire length of the worm 6 and nut 7 two continuous helical contact lines 30 and 31 exist, as best seen in FIGURES 2 and 3, with the remaining faces of each thread pitch forming two closed and crescent-shaped pumping cavities 32, 33. It will be seen that each such crescent-shaped cavity 32 lies between the core 22 of the screw or worm 6 and the core surface or inner diameter 24 of the nut 7, whereas each crescent-shaped cavity 33 lies between the outer surface or diameter 23 of the worm 6 and the thread diameter 25 of the nut 7.

As can be clearly seen from FIGURES 2 and 3, the continuous helical lines of contact 30 and 31, with the nut 7 and worm 6 in the position shown in FIGURE 1, are radially spaced from one another at the locations 34 and 35, respectively, gradually approaching one another at various angular displacements about the respective rotational axes 26, 27, and at location 36 which is 180° from locations 34, 35 the helical lines of contact 30, 31 overlap or coincide. It will further be seen that in correcting the thread profile of the thread faces 28 and 29 due to the eccentricity of nut 7 and worm 6 the confronting thread faces 28 and 29 are somewhat concave, as best seen in FIGURE 4. In determining the exact curvature of the thread faces 28 and 29 such will be calculated in accordance with standard mathematical equations and theory well known to persons versed in the art to which this invention is addressed, and since such are not important for understanding the underlying principles of the invention no further discussion thereof is believed warranted. By way of completeness, it is mentioned that in determining the curvature of the face 28 of the screw or worm 6 there is taken into consideration the inner diameter 24 of the nut 7 and the eccentricity $e$, whereas when determining the curvature of the face 29 of the nut 7 the outer diameter 23 of the screw or worm 6 and the eccentricity $e$ are taken into consideration.

Consistent with what has been described up to the present the operation of the helical or screw pump designed according to the invention will now be considered:

The fluid medium supplied from a suitable non-illustrated container or supply source flows through the inlet or intake opening 2 appearing in the detachable wall 1 and then into the circular compartment 13. From this location such fluid medium flows through the openings or ports 12 provided at the crosspiece coupling disk 11 into the adjacent end of the worm 6 and the nut 7. It will be recalled that such worm 6 and nut 7 are rotating since they are driven by any suitable drive means. Since the nut 7 is eccentric with respect to the shaft 5 whereas the worm 6 is concentric with respect to such shaft 5, and further, since at least two neighboring confronting faces 28 and 29 of worm 6 and nut 7 are profiled according to the description presented above, and in such a manner as to provide along the entire length of the worm 6 and nut 7 two continuous lines of contact 30 and 31, there exists within each thread pitch two closed crescent-shaped cavities 32, 33 containing the fluid medium to be conveyed. By virtue of the rotation of the shaft 5 together with worm 6 as well as the screw nut 7, such cavities 32, 33 move axially along the length of the worm and nut, as is known, and thus transport the fluid medium from the intake side to the outlet side of the pump. This fluid medium flowing into the annular compartment 8 and then finally into the outlet or discharge duct 3.

Compared with the helical pumps known at the present the pump of the subject invention possesses the advantage of being simple in design and easy to manufacture. Furthermore, there exists a close contact between worm and nut along the entire length of these threaded elements, leading to a much higher volumetric efficiency and more uniform wear of the rotating members. Moreover, with a given diameter the attainable pressure increases with increasing length of worm and nut. Also, the fluid medium flow is continuous, that is free from pulsations, and as a further important advantage it should be mentioned that worm and nut rotate at equal speed. It should further be appreciated and understood that the pump described herein can be used for the most diverse applications, as such undoubtedly will suggest themselves to those skilled in the art.

While there is shown and described present preferred embodiments of the invention it is to be distinctly understood that the invention is not limited thereto but may be otherwise variously embodied and practised within the scope of the following claims.

What is claimed is:

1. A helical pump comprising at least one rotatable worm and at least one rotatable hollow nut, said rotatable worm being located internally of said rotatable hollow nut, the axis of rotation of said nut being eccentric with respect to the axis of rotation of said worm, means for coupling together said worm and said nut, at least one thread face of said worm and said nut being profiled in such a manner as to provide along the entire length of said worm and said nut two continuous helical lines of contact, with the remaining faces of each thread pitch forming two closed and crescent-shaped pumping cavities.

2. A helical pump according to claim 1 wherein said coupling means comprises a crosspiece coupling disk including means engageable with said nut and said worm for coupling together said nut and said worm.

3. A helical pump according to claim 2 wherein said engageable means of said crosspiece coupling disk defines intersecting slots and said worm and said nut are provided with projections engaging with said slots.

4. A helical pump according to claim 2 wherein said crosspiece coupling disk is provided with opening means to permit fluid medium to enter said crescent-shaped pumping cavities.

5. A helical pump according to claim 1 including a housing provided with fluid medium inlet and outlet means, and an annular compartment communicating with said fluid outlet means.

6. A helical pump according to claim 5 wherein said housing incorporates a detachable wall provided with said fluid medium inlet means.

7. A helical pump comprising at least one rotatable worm and at least one rotatable hollow nut, said rotatable worm being located internally of said rotatable hollow nut, the axis of rotation of said nut being eccentric with respect to the axis of rotation of said worm, means for coupling together said worm and said nut so as to rotate at the same speeds, at least one thread face of said worm and said nut being profiled in such a manner as to provide along the length of said worm and said nut two continuous helical lines of contact, with the remaining faces of each thread pitch forming two closed and crescent-shaped cavities.

8. A helical pump according to claim 7 wherein said one thread face of said worm and said nut are concave in profile.

9. A helical pump comprising at least one rotatable worm and at least one rotatable hollow nut, said rotatable worm being located internally of said rotatable hollow nut, the axis of rotation of said nut being eccentric with respect to the axis of rotation of said worm, means for rotatably intercoupling said worm and said nut, at least one thread face of said worm and said nut being profiled in such a manner as to provide along the entire length of said worm and said nut two continuous helical lines of contact, with the remaining faces of each thread pitch forming two closed and crescent-shaped cavities, said two helical lines of contact being radially spaced from one another in at least one position of said worm and nut and at a substantially diametrically opposed location therefrom said two continuous helical lines of contact coincide with one another.

10. A helical pump comprising at least one rotatable worm with integral thread means and at least one rotatable hollow nut with integral thread means, said rotatable worm being located internally of said rotatable hollow nut, the axis of rotation of said nut being eccentric with respect to the axis of rotation of said worm, means for rotatably intercoupling said worm and said nut, at least one thread face of said worm and said nut being profiled in such a manner as to provide along the entire length of said worm and said nut two continuous helical lines of contact, with the remaining faces of each thread pitch forming two closed and crescent-shaped cavities, said two helical lines of contact being radially spaced from one another in at least one position of said worm and nut and at a substantially diametrically opposed location in the vicinity of said two crescent-shaped cavities said two continuous helical lines of contact coincide with one another.

References Cited by the Examiner

UNITED STATES PATENTS

| 1,295,068 | 2/1919 | Rolkerr | 230—140 |
| 1,698,802 | 1/1929 | Montelius | 91—84 |
| 2,527,536 | 10/1950 | Engberg | 103—117 |

SAMUEL LEVINE, *Primary Examiner.*

DONLEY J. STOCKING, *Examiner.*

R. M. VARGO, *Assistant Examiner.*